United States Patent
Hashimoto et al.

(10) Patent No.: US 9,866,084 B2
(45) Date of Patent: Jan. 9, 2018

(54) INSULATED STATOR OF A MOTOR HAVING HOLDING GROOVES TO HOLD END PARTS OF A COIL WINDING

(71) Applicant: DENSO CORPORATION, Kariya, Aichi-pref. (JP)

(72) Inventors: Hideki Hashimoto, Nukata-gun (JP); Eiji Miyazaki, Hazu-gun (JP)

(73) Assignee: DENSO CORPORATION, Kariya (JP)

(*) Notice: Subject to any disclaimer, the term of this patent is extended or adjusted under 35 U.S.C. 154(b) by 456 days.

(21) Appl. No.: 13/747,960

(22) Filed: Jan. 23, 2013

(65) Prior Publication Data
US 2013/0187513 A1 Jul. 25, 2013

(30) Foreign Application Priority Data

Jan. 25, 2012 (JP) .................... 2012-12866

(51) Int. Cl.
*H02K 3/38* (2006.01)
*H02K 3/52* (2006.01)
(Continued)

(52) U.S. Cl.
CPC .............. *H02K 3/38* (2013.01); *H02K 3/522* (2013.01); *H02K 15/095* (2013.01); *H02K 1/148* (2013.01);
(Continued)

(58) Field of Classification Search
CPC ........ H02K 3/38; H02K 3/522; H02K 15/095; H02K 3/50; H02K 15/0435; H02K 15/08; H02K 15/085
(Continued)

(56) References Cited

U.S. PATENT DOCUMENTS 6,923,399 B1* 8/2005 Stratico .............. H02K 15/0056
242/432.6
7,116,023 B2* 10/2006 Wang et al. ................... 310/71
(Continued)

FOREIGN PATENT DOCUMENTS

JP 06-082828 11/1994
JP 2002-034212 1/2002
(Continued)

OTHER PUBLICATIONS

Office Action (2 pages) dated Jan. 21, 2014 issued in corresponding Japanese Application No. 2012-012866 and English translation (3 pages).

*Primary Examiner* — Bernard Rojas
*Assistant Examiner* — Rashad Johnson
(74) *Attorney, Agent, or Firm* — Nixon & Vanderhye PC

(57) ABSTRACT

A core segment sub-assembly has a first holding groove, which holds a start part of a coil wire of a three-phase winding, and a second holding groove, which holds an end part of the coil wire of the three-phase winding, at positions on an axial end surface of an annular covering part and shifted in a circumferential direction relative to a tooth covering part, on which the winding is provided. The first holding groove and the second holding groove sandwiches the tooth covering part and are separated more from each other as extending in a radially outward direction. The positions and the directions of the first holding groove and the second holding grooves are matched to the paths of the coil wire wound by a flyer type winding machine. The stator can thus be made suited to a winding process by the flyer type winding machine.

6 Claims, 14 Drawing Sheets

(51) Int. Cl.
*H02K 15/095* (2006.01)
*H02K 1/14* (2006.01)
*H02K 15/00* (2006.01)

(52) U.S. Cl.
CPC ..... *H02K 15/0075* (2013.01); *H02K 2203/06* (2013.01)

(58) Field of Classification Search
USPC ...... 310/87, 215, 259, 432.6, 68 B, 71, 218; 242/432.6
See application file for complete search history.

(56) References Cited

U.S. PATENT DOCUMENTS

| | | | | |
|---|---|---|---|---|
| 7,382,075 B2* | 6/2008 | Wang | ................ | H02K 3/522 310/179 |
| 8,008,832 B2* | 8/2011 | Rhode | ................ | H02K 1/148 310/216.058 |
| 8,314,528 B2* | 11/2012 | Shinohara | ................ | H02K 3/522 310/194 |
| 8,497,618 B2* | 7/2013 | Kato | ................ | H02K 3/28 310/194 |
| 9,024,500 B2* | 5/2015 | Kimura et al. | ................ | 310/194 |
| 2007/0176511 A1* | 8/2007 | Sakai et al. | ................ | 310/218 |
| 2008/0024029 A1* | 1/2008 | Shiono et al. | ................ | 310/194 |
| 2011/0020154 A1* | 1/2011 | Matsuda et al. | ................ | 417/410.1 |
| 2011/0175485 A1* | 7/2011 | Naganawa | ................ | H02K 1/146 310/214 |
| 2011/0291519 A1* | 12/2011 | Modi | ................ | H02K 3/522 310/215 |
| 2011/0298329 A1* | 12/2011 | Kinugawa et al. | ................ | 310/208 |
| 2012/0286619 A1* | 11/2012 | Tsuiki et al. | ................ | 310/215 |
| 2014/0028143 A1* | 1/2014 | Ishigami | ................ | H02K 3/00 310/208 |
| 2014/0300242 A1* | 10/2014 | Honda | ................ | H02K 1/148 310/216.009 |
| 2014/0327336 A1* | 11/2014 | Ewert | ................ | H02K 3/522 310/215 |

FOREIGN PATENT DOCUMENTS

| | | |
|---|---|---|
| JP | 2007-330059 | 12/2007 |
| JP | 2011-35989 | 2/2011 |

* cited by examiner (FIRST STEP)

(SECOND STEP)

(THIRD STEP)

(FOURTH STEP)

(FIFTH STEP)

(SIXTH STEP)

(SEVENTH STEP)

(EIGHTH STEP)

INSULATED STATOR OF A MOTOR HAVING HOLDING GROOVES TO HOLD END PARTS OF A COIL WINDING

CROSS REFERENCE TO RELATED APPLICATION

This application is based on and incorporates herein by reference Japanese patent application No. 2012-012866 filed on Jan. 25, 2012.

TECHNICAL FIELD

The present disclosure relates to a stator of a motor and a method for manufacturing the same.

In a conventional brushless motor, power supply to a winding wound on a stator core is controlled to continuously switch over magnetic fields thereby rotating a rotor provided radially inside the stator. The winding is wound about teeth of the stator core, respectively.

For example, according to JP 2011-35989A, a stator of a motor is formed of a yoke, teeth and a plurality of core segments. The core segments are linked bendably at bent-connecting parts at both ends of the yoke. In the core segment, accommodating grooves are formed to accommodate a winding start part and a winding end part of a bridging wire. The accommodating groove for the winding start part of the bridging wire is formed at a position overlapping relative to the tooth of the yoke in the circumferential direction. The accommodating groove for the winding end part of the bridging wire is formed in parallel with the center line of the tooth.

The winding is wound generally in two methods. One is a spindle rotation type winding method (spindle rotation method) and the other is a flyer type winding method (flyer method). According to the spindle rotation method, a coil wire for a winding is wound about a work while rotating the work. According to the flyer method, a work is fixed and a flyer arm supporting a coil wire at a wire end is rotated. The flyer method has a higher productivity generally except for a case that the work has a simple shape.

The flyer method winding process is not suited for an example disclosed in JP 2011-35989A, in which plural core segments are coupled bendably, for the following reasons.

According to the flyer method, the rotation axis of a flyer arm is located on an extension of a center line of a tooth. At the start of winding, a coil wire is set up toward the outer periphery of the tooth from a terminal position separated from the rotation axis of the flyer arm by a predetermined distance. That is, the coil wire path is directed from a radially outside toward a radially inside and inclined from the outside to the inside. The coil wire path is not directed further inward from the outer periphery of the tooth. At the end of winding, the coil wire is directed oppositely, that is, from the radially inside toward the radially outside and inclined from the outer periphery of the tooth to the outside. The accommodating grooves for the winding start part and the winding end part is not suited for the wire paths in the flyer method. If the flyer method is applied to the arrangement of the accommodating grooves, it is necessary to provide a support jig or the like in the middle of the coil wire so that the coil wire may be bent there. For this reason, the above-described winding method is not suited to the flyer type winding method. It is particularly not practical for automating the manufacturing process.

SUMMARY

It is therefore an object to provide a stator, which is suitable for a flyer-type winding method and particularly suitable for an automated process, and a method for manufacturing the same.

According to one aspect, a stator of a motor is provided to rotate a rotor by a rotating magnetic field generated when electric power is supplied. The stator includes a winding, a core and an insulator. The core includes an annular part and a plurality of tooth parts. The annular part extends in a circumferential direction to form an annular outer periphery, and the plurality of tooth parts protrudes inwardly in a radial direction from the annular part. The insulator includes an annular covering part, which covers and insulates the annular part, and a tooth covering part, which covers and insulates the tooth part and on which the winding is wound. The insulator further includes a first holding groove, which holds a start part of a coil wire of the winding, and a second holding groove, which holds an end part of the coil wire of the winding, at positions on an axial end surface of the annular covering part and shifted in a circumferential direction relative to the tooth covering part. The first holding groove and the second holding groove are formed sandwiching the tooth covering part therebetween and distanced more from each other as extending in a radially outward direction.

According to a second aspect, a stator manufacturing method is provided for winding, by a flyer type winding machine, a coil wire about a tooth covering part of the stator of the first aspect. In this stator manufacturing method, a start part of the coil wire of the winding is accommodated in the first holding groove. The coil wire is wound about the tooth covering part. An end part of the coil wire of the winding is accommodated in the second holding groove.

BRIEF DESCRIPTION OF THE DRAWINGS

The above and other objects, features and advantages of a stator and a manufacturing method therefore will become more apparent from the following detailed description made with reference to the accompanying drawings. In the drawings.

DETAILED DESCRIPTION OF THE PREFERRED EMBODIMENT

Figure 2:
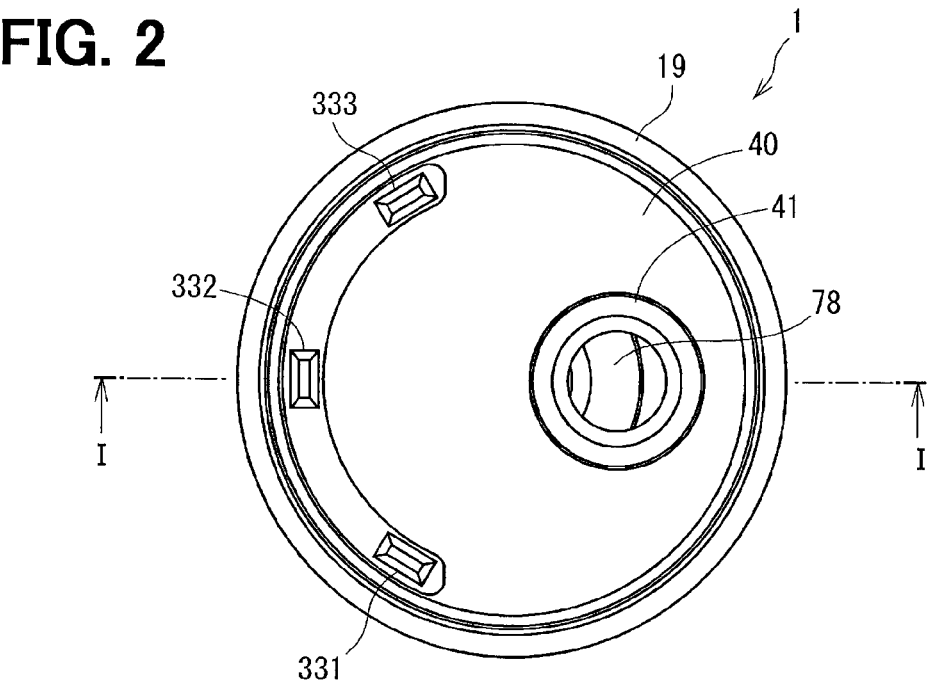
FIG. 2 is a top plan view taken in a direction II in FIG. 1.
Figure 3:
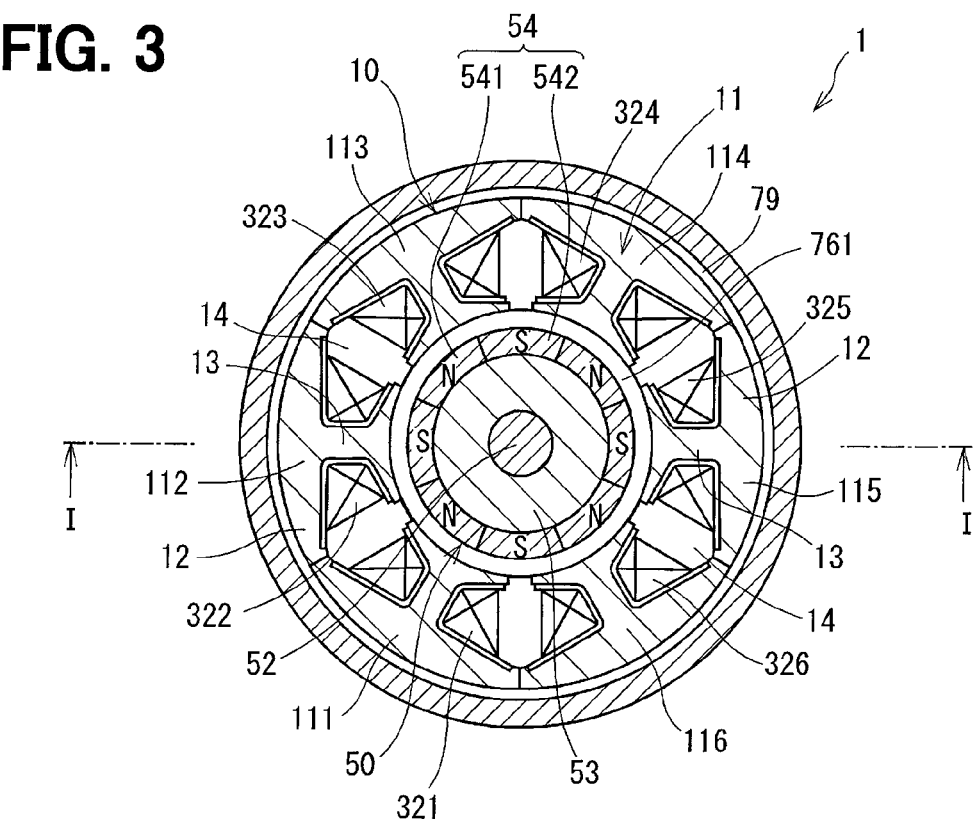
FIG. 3 is a sectional view taken along a line in FIG. 1.

A stator of a motor and a manufacturing method therefore will be described below with reference to one embodiment shown in the drawings. The stator is provided in a brushless motor, which is used as a motor part of a fuel pump configured as shown in FIG. 1 to FIG. 3.

Figure 1:
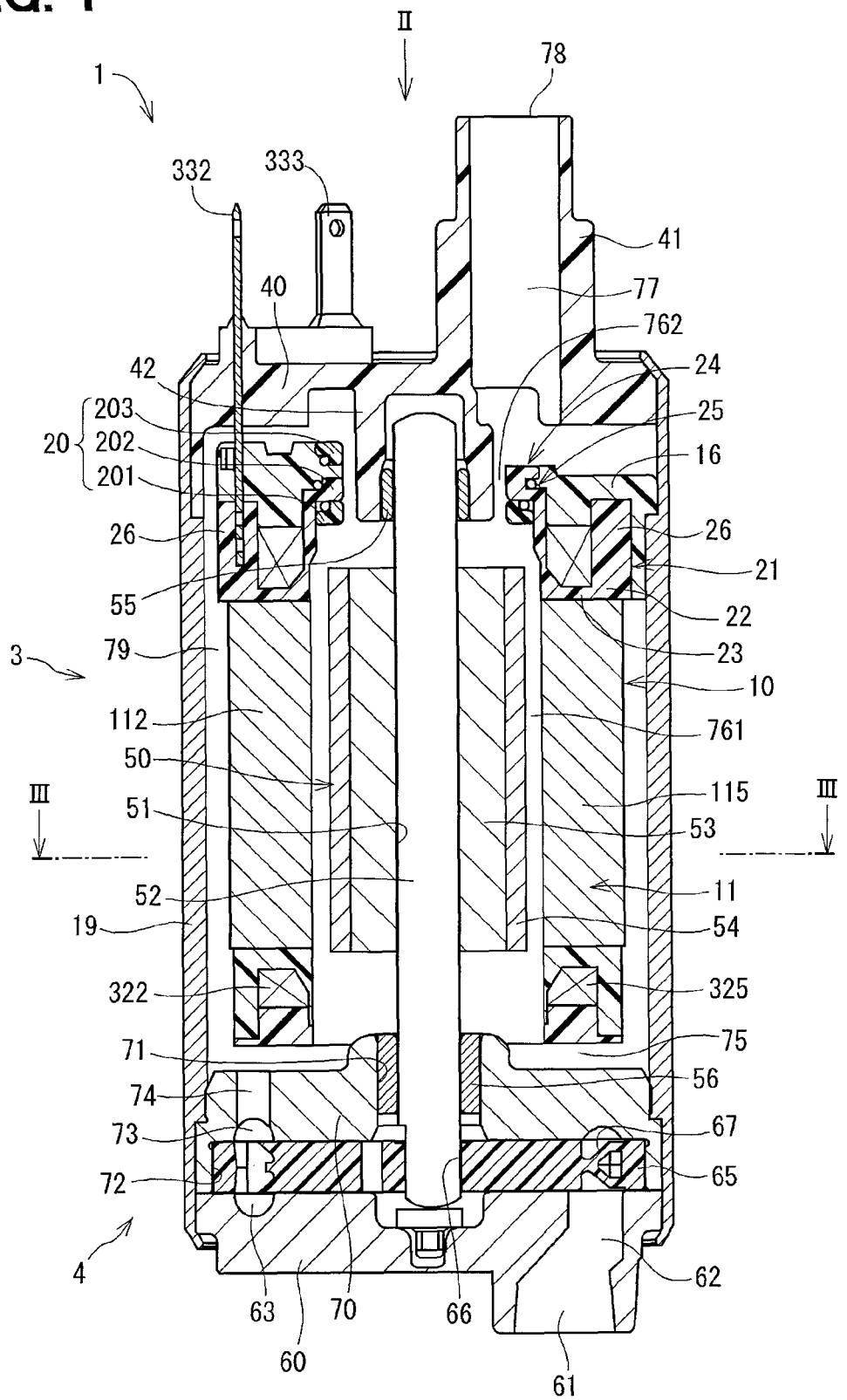
FIG. 1 is a longitudinal sectional view of a fuel pump using a stator of a motor according to one embodiment.

A fuel pump 1 suctions fuel in a fuel tank (not shown) from its suction port 61 shown in the bottom part of FIG. 1 and discharges the suctioned fuel into an internal combustion engine through a discharge port 78 shown in the top part of FIG. 1. The fuel pump 1 is divided generally into a motor part 3, which is a brushless motor, and a pump part 4. The outer part is formed of a housing 19, a pump cover 60, an end cover 40 and the like. In the following description of the fuel pump 1, the top part and the bottom part of FIG. 1 are referred to as a discharge port 78 side and the suction port 61 side, respectively.

The housing 19 is formed of a metal such as iron in a cylindrical shape. The pump cover 60 closes one axial end of the suction port 61 side of the housing 19. The pump cover 60 is fixed inside the housing 19 with its fringe of the end part of the suction port 61 side of the housing 19 being crimped inwardly, so that it is prevented from being pulled apart in the axial direction. The end cover 40 is formed of resin and closes the other axial end part of the discharge port 78 side of the housing 19. The end cover 40 is fixed inside the housing 19 with its fringe of the end part of the discharge port 78 of the housing 19 being crimped inwardly, so that it is prevented from being pulled apart in the axial direction.

A cylindrical part 41 is formed to protrude in the upper direction in FIG. 1 at the outside of the end cover 40. The discharge port 78 is formed at the end part of the cylindrical part 41. A discharge passage 77, which communicates to the discharge part 78, is formed inside the cylindrical part 41. A cylindrical part 42 is formed to protrude in a cylindrical shape toward the rotor 50 side on the center axis inside the end cover 40. A bearing 55 is fitted in the inside of the cylindrical part 42.

The motor part 3 includes a stator 10, a rotor 50, a shaft 52 and the like. The stator 10 is formed in a cylindrical shape and accommodated inside the housing 19. The stator 10 includes a core 11, an insulator 21, a winding 30 (FIG. 4 to FIG. 6), electric terminals 331, 332, 333 and the like. The core 11 is formed of magnetic material such as iron. The winding 30 and the core 11 are insulated from each other by the insulator 21 by inserting and resin-molding the core 11. The inside wall of the core 11, that is, surface facing the rotor 50, is not resin-molded so that the metal surface is exposed. The stator 10 is formed of three stator segments, which are assembled in a cylindrical unit as described in detail later.

The winding 30 is wound about a core sub-assembly 20, which is insulated and covered by the insulator 21 resin-molding the core 11. The insulator 21 holds the core 11 and the winding 30 therein while insulating the same. The winding 30 is formed of three phase coils made of coil wires (coil wires), the surface of which is covered with an insulating film. The core sub-assembly 20 wound with the winding 30 is further resin-molded integrally by a resin mold part 16.

As shown in FIG. 3, the core 11 is formed of six divided cores 111 to 116. Each divided core 111 to 116 includes an annular part 12 forming an annular outer fringe and a tooth part 13 protruding in the radially inward direction from the annular part 12. Six slots 14 are formed to extend in the axial direction. Each slot 14 is provided between adjacent two of the tooth parts 13 of the divided cores 111 to 116.

A pair of divided cores 111 to 116, which faces each other diagonally through the shaft 52 (center axis), is set as one unit. The pair is insulated and covered by the insulator 21 and provides a core segment sub-assembly. That is, the core sub-assembly 20 is formed of three core segment sub-assemblies 201 to 203. Each core segment sub-assembly 201 to 203 is wound with winding to provide a stator segment described later.

Figure 4:
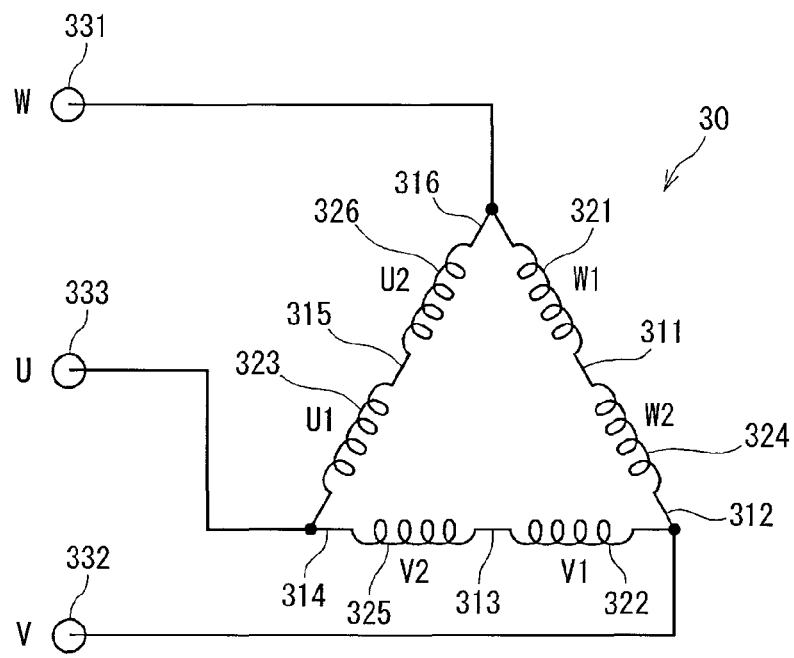
FIG. 4 is a wiring diagram of a winding of the motor shown in FIG. 3.

The winding 30 is wound in the concentrated manner about the tooth part 13 of each divided core 111 to 116 continuously through each slot 14. The winding 30 wound about the tooth part 13 in the concentrated manner is referred to as coils 321 to 326. As shown in FIG. 4, the winding 30 includes the coils 321 to 326 as well as bridging wires (crossover wires) 311 to 316. Since FIG. 1 is a sectional view taken along a line I-I in FIG. 2 and FIG. 3, the left half of FIG. 1 shows a cross-section of the divided core 112, about which the coil 322 is wound, and the right half of FIG. 1 shows a cross-section of the divided core 115, about which the coil 325 is wound.

The rotor 50 is accommodated rotatably inside the stator 10. The rotor 50 is provided with magnets 54 around it outer periphery of the iron core 53. As shown in FIG. 3, the magnets 54 are arranged such that N-poles 541 and S-poles 542 are provided alternately in the circumferential direction. As one example, a total of eight poles are provided by four pole pairs of N-pole 541 and S-pole 542. The shaft 52 is press-fitted into a shaft hole 51 formed on the center axis of the rotor 50 to rotate with the rotor 50.

The terminals 331, 332 and 333 are provided at positions, which do not interfere the cylindrical part 41 of the end cover 40, to protrude in the axial direction. The terminals 331, 332 and 333 correspond to a W-phase terminal, a V-phase terminal and a U-phase terminal, respectively.

As shown in FIG. 4, the terminals 331, 332 and 333 are connected to the winding 30 of each phase so that three-phase electric power of a drive apparatus (not shown) is supplied to the winding 30 through the terminals 331, 332 and 333. When the power is supplied to the winding 30, the stator 10 generates a rotating magnetic field thereby to rotate the rotor 50 and the shaft 52.

Referring to FIG. 1, the pump cover 60 has the suction port 61, which is cylindrical and opens toward the bottom direction in FIG. 1. A suction passage 62 is formed in the pump cover 60 to pass in the plate thickness direction. A pump casing 70 is provided in a generally disk shape between the pump cover 60 and the stator 10. A hole 71 is formed in the central part of the pump casing 70 to penetrate the pump casing 70 in the plate thickness direction. A bearing is fitted in the hole 71 of the pump casing 70. The bearing 56 rotatably supports both axial end sides of the shaft 52 jointly with the bearing 55 fitted in the end cover 40. The rotor 50 and the shaft 52 are thus rotatable relative to the end cover 40 and the pump casing 70.

An impeller 65 is formed of resin in generally a disk shape. The impeller 65 is accommodated in a pump chamber 72 provided between the pump cover 60 and the pump casing 70. An end part of the shaft 52 at the pump camber 72 side is formed in a character D shape, by which a part of the outer wall is curt. This end part is fitted in a hole 66, which is also formed in the central part of the impeller 65 and in a corresponding shape of character D. Thus the impeller 65 is rotatable inside the pump chamber 72 by the rotation of the shaft 52.

A groove 63, which is communicated with the suction passage 62, is formed on a surface of the impeller 65 side of the pump cover 60. A groove 73 is formed on a surface of the impeller 65 side of the pump casing 70. A passage 74 is formed in the groove 73 to penetrate the pump casing 70 in the plate thickness direction. A vane part 67 is formed on the impeller 65 at positions, which correspond to the groove 63 and the groove 73.

With electric power supplied to the winding 30 of the motor 3, the impeller 65 rotates with the rotor 50 and the shaft 52 so that the fuel is introduced into the groove 63 through the suction part 61 from the fuel tank. The fuel introduced into the groove 63 is pressurized and led to the groove 73 by rotation of the impeller 65. The fuel thus pressurized is led into an intermediate chamber 75 of the motor part 3 side of the pump casing 70 through the passage 74. The fuel is led from the intermediate chamber to the discharge port 77 through fuel passages, which extends axially in the motor part 3, and discharge from the discharge port 78.

Two fuel passages are provided to extend axially in the motor part 3. A first fuel passage is provided by passages 761 and 762. The passage 761 is formed between the outer wall of the rotor 50 and the inner wall of the stator 10. The passage 762 is formed between the outer wall of the cylindrical part 42 of the end cover 40 and the inner wall of the central annular part 24 of the insulator 21. A second fuel passage is formed between the outer wall of the stator 10 and the inner wall of the housing 19.

The configuration of the stator 10 will be described next with reference to FIG. 4 to FIG. 10. As shown in FIG. 4, the winding 30, which forms the magnetic circuit of the stator 10, is a three-phase winding connected in a delta shape. Two coils are connected in series between two phase terminals. Specifically, between the W-phase terminal 331 and the V-phase terminal 332, a W-phase first coil 321 (W1), a bridging wire 311, a W-phase second coil 324 (W2) and a bridging wire 312 are connected in this order. Between the V-phase terminal 332 and the U-phase terminal 333, a V-phase first coil 322 (V1), a bridging wire 313, a V-phase second coil 325 (V2) and a bridging wire 314 are connected in this order. Between the U-phase terminal 333 and the W-phase terminal 331, a U-phase first coil 323 (U1), a bridging wire 315, a U-phase second coil 326 (U2) and a bridging wire 316 are connected in this order.

Figure 5:
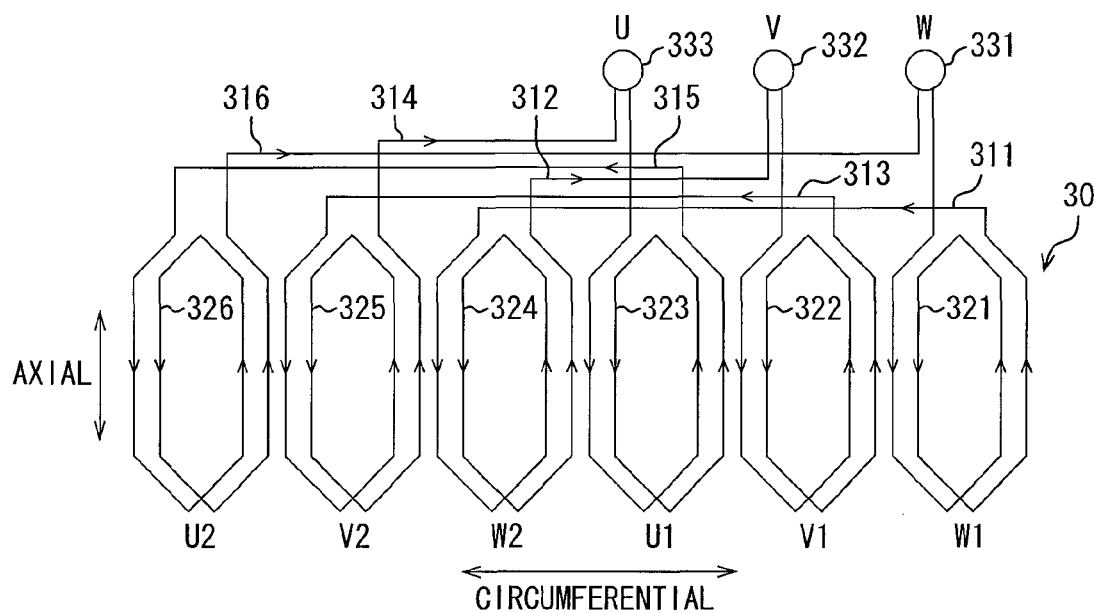
FIG. 5 is a schematic diagram of a wiring arrangement of the winding shown in FIG. 4.

FIG. 5 shows a layout of winding connection corresponding to the wiring diagram of FIG. 4. In this figure, arrows indicate directions of winding of coil wires. The winding can be illustrated by a single line, for example, starting from the W-phase terminal 331 and returning to the W-phase terminal 331.

Figure 6:
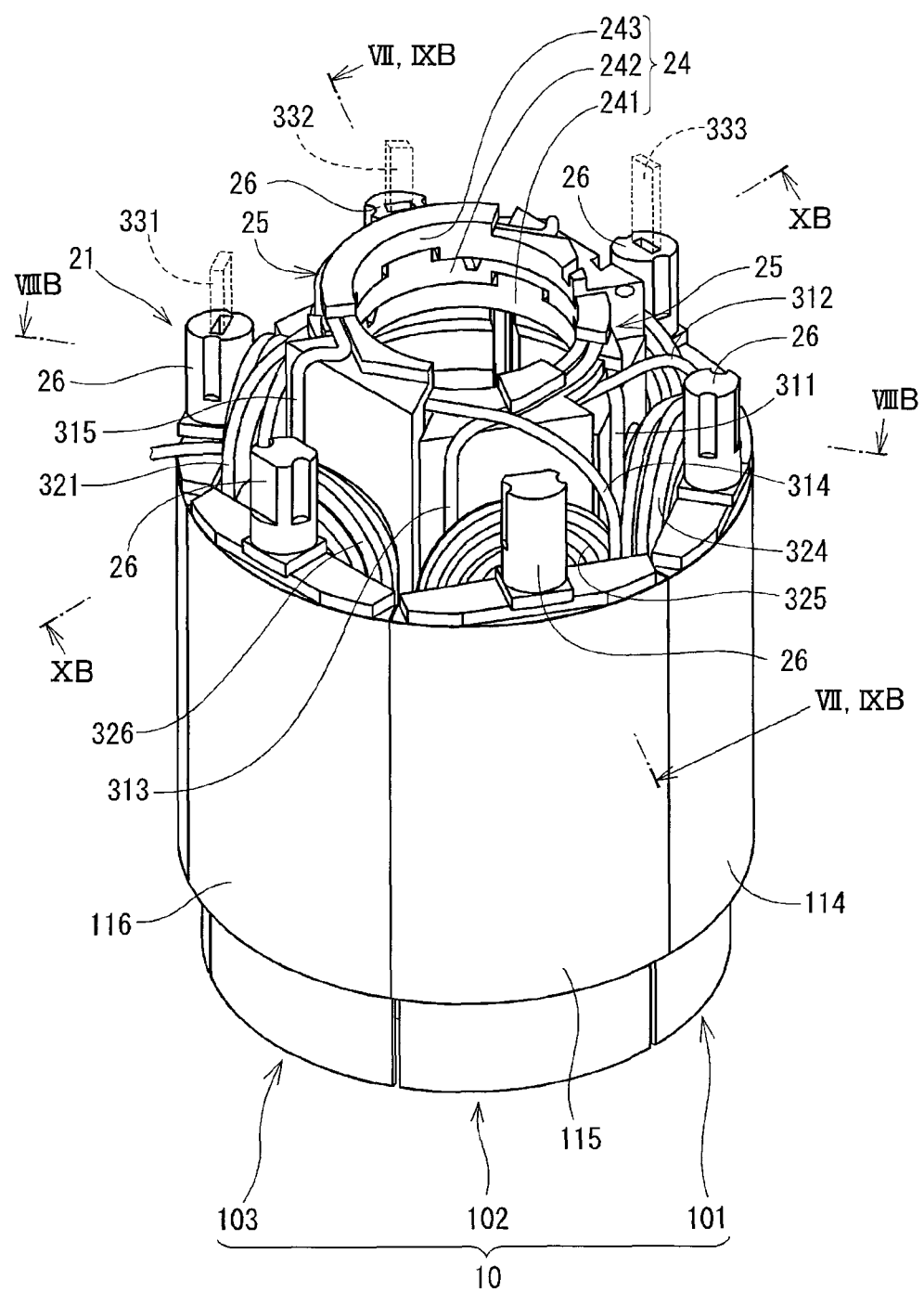
FIG. 6 is a perspective view of a stator, which is before resin-molded, according to the embodiment.
Figure 7:
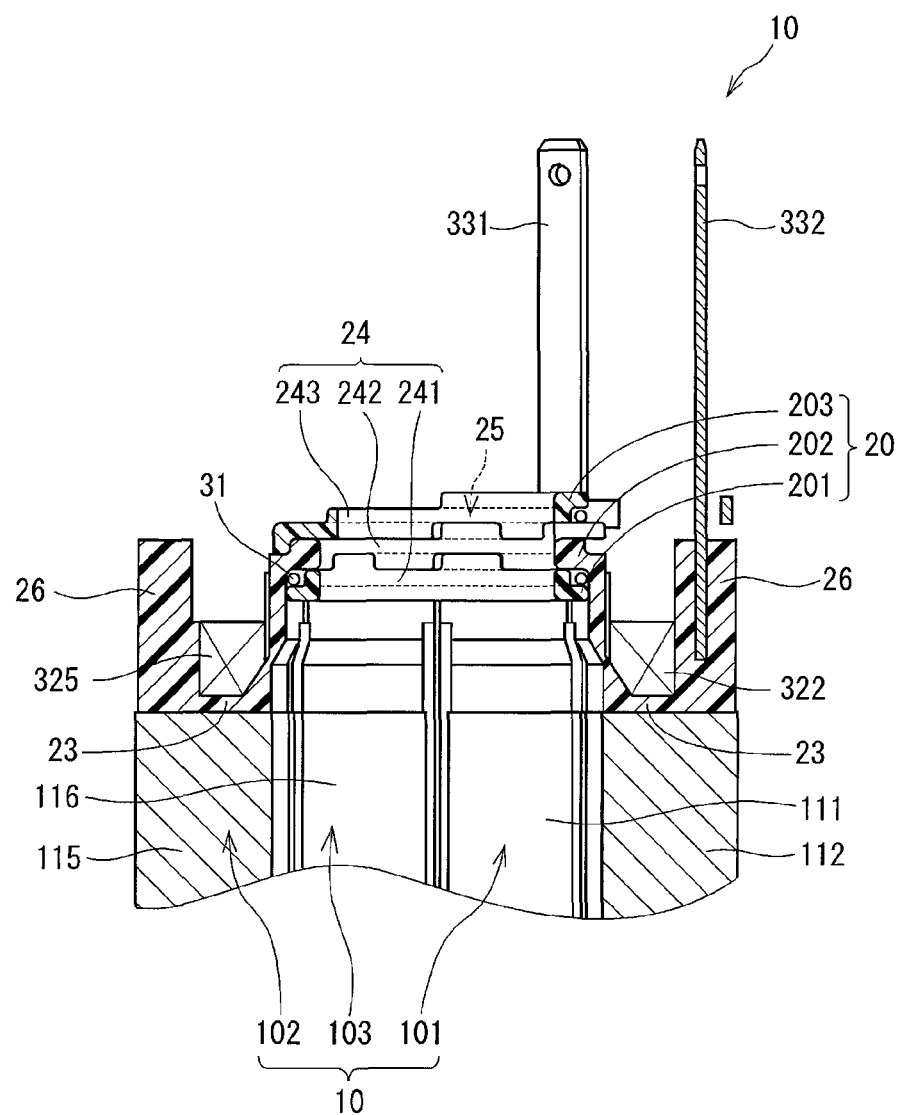
FIG. 7 is a sectional view taken along a line VII-VII in FIG. 6, in which a stator segment is assembled.
Figure 8A:
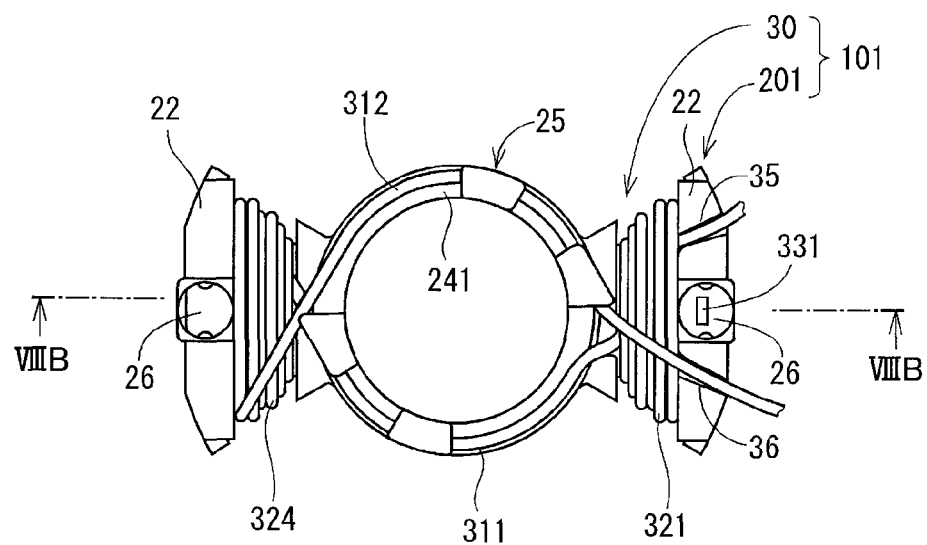
FIG. 8A is a plan view of a W-phase stator segment.
Figure 8B:
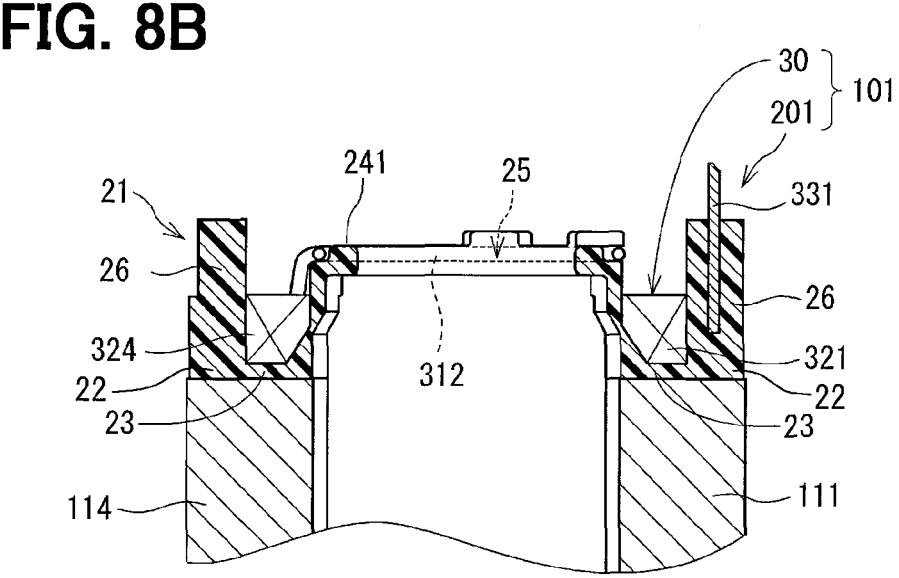
FIG. 8B is a sectional view taken along in FIG. 6 and FIG. 8A.
Figure 9A:
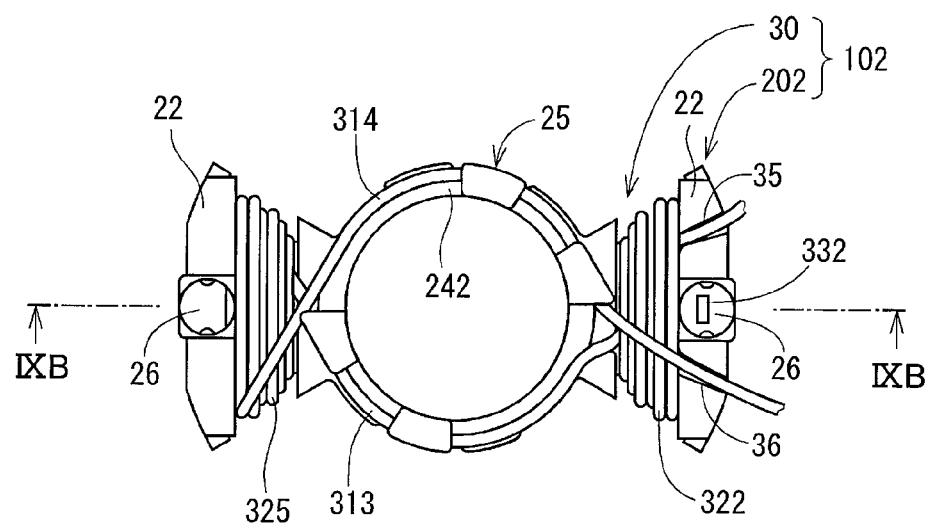
FIG. 9A is a plan view of a V-phase stator segment.
Figure 9B:
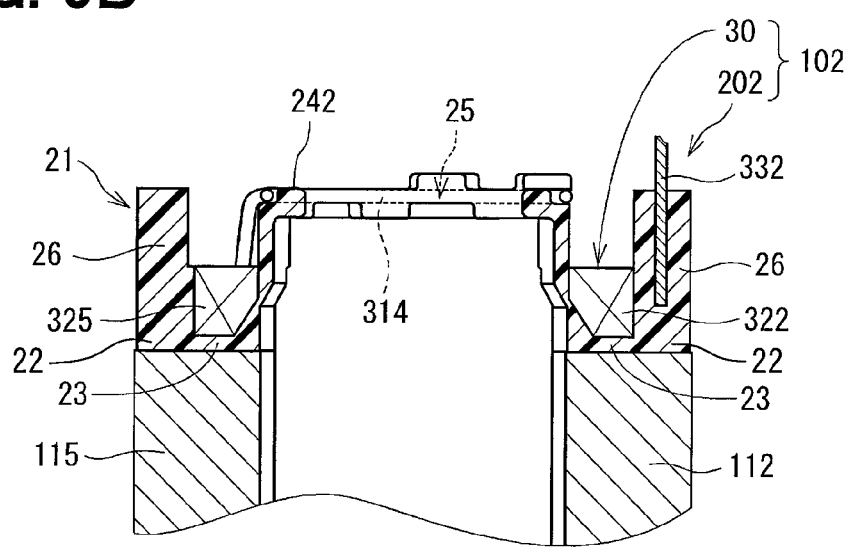
FIG. 9B is a sectional view taken along IXB-IXB in FIG. 6 and FIG. 9A.
Figure 10A:
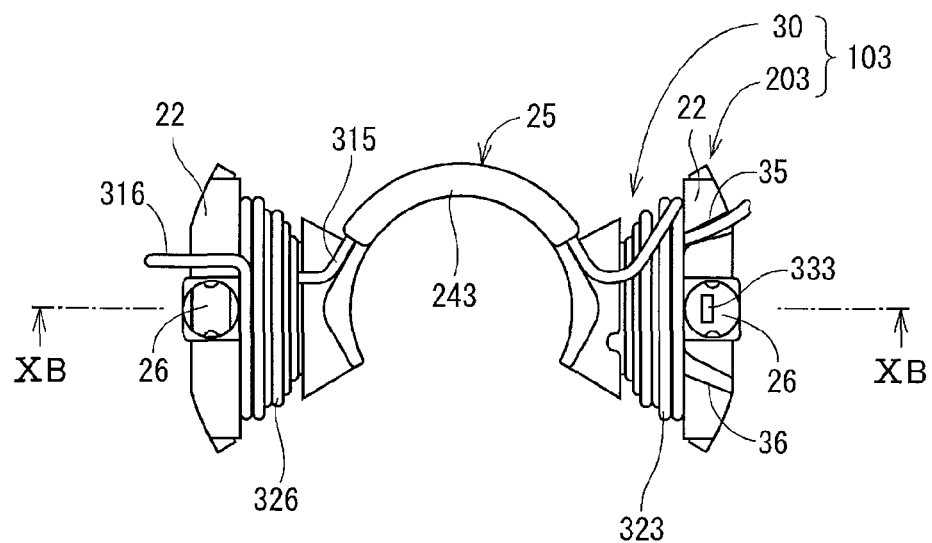
FIG. 10A is a plan view of a U-phase stator segment.
Figure 10B:
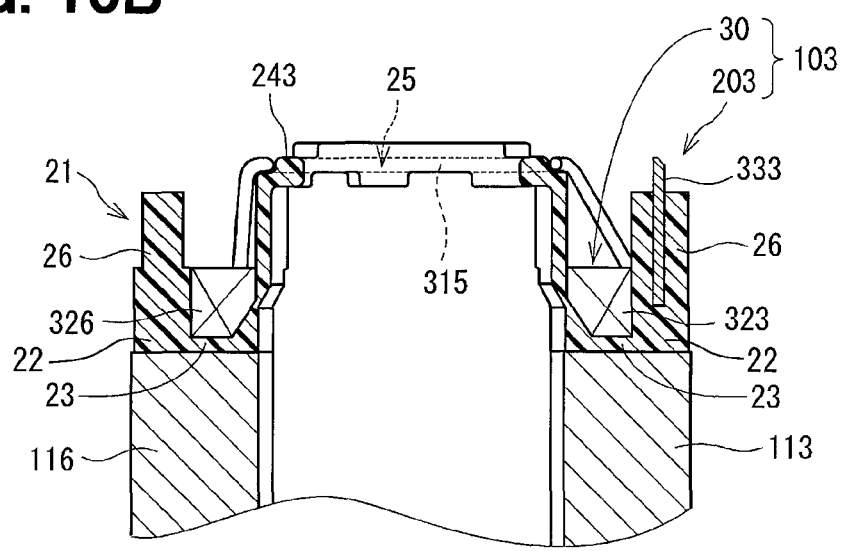
FIG. 10B is a sectional view taken along XB-XB in FIG. 6 and FIG. 10A.

The mechanical configuration of the stator 10 will be described next with reference to FIG. 6 to FIG. 10. As shown in FIG. 6 and FIG. 7, the stator 10 is formed by assembling three stator segments 101, 102 and 103 into one unit. The stator segments 101, 102 and 103 are formed by winding the winding 30 about the core segment sub-assemblies 201, 202 and 203, respectively. Specifically, the stator segment 101 includes divided cores 111 and 114 of the W-phase as shown in FIG. 8A and FIG. 8B, the stator segment 102 includes divided cores 112 and 115 of the V-phase as shown in FIG. 9A and FIG. 9B, and the stator segment 103 includes divided cores 113 and 116 of the U-phase as shown in FIG. 10A and FIG. 10B.

Each of the core segment sub-assemblies 201, 202 and 203 is formed of an annular covering part 22, a tooth covering part 23, a central annular part 24 (241, 242 and 243), and the like. The annular covering part 22 covers the annular part 12 of the core 11. The tooth covering part 23 covers the tooth part 13 of the core 11. The tooth covering part 23 is wound with the winding 30 to provide the coils 321 to 326. Among the coils 321 to 326, the bridging wires 311 to 316 are arranged to connect the coils in the circumferential direction and connect the coil and the terminal. In the central annular parts 241, 242 and 243, a bridging wire holding part 25 is formed to tightly hold the bridging wire 311 to 316. The central annular part 243 of the U-phase core segment sub-assemblies 203 shown in FIG. 10B is formed in a semi-annular shape.

The central annular parts 214, 242 and 243 of the core segment sub-assemblies 201, 202 and 203 are formed radially inside of the core 11 so that the heights of the central annular parts 241, 242 and 243 are different one another in the axial direction. Specifically, the central annular parts 241, 242 and 243 are arranged in this order from the lowest height. These annular parts 241, 242 and 243 are stacked and so that three core segment sub-assemblies 201, 201 and 203 are assembled.

The annular covering part 22 is formed of a support column part 26, which protrudes from the axial end surface of the divided core. The support column part 26 extends over the axial heights of the coils 321 to 326, which are wound about the tooth covering part 23.

The configuration of holding grooves 35 and 36 of the annular covering part 22 will be described with reference to FIG. 11 to FIG. 14, which show the annular covering part 22 in the W-phase core segment sub-assembly 201 as a representative example of three core segment sub-assemblies.

As shown in FIG. 11 to FIG. 14, among the two annular covering parts 22 of the core segment sub-assembly 201, a first holding groove 35 and a second holding groove 36 are formed on one of the annular covering parts 22, which is on the terminal 331 side, at positions circumferentially deviated from the tooth covering part 23. The grooves 35 and 36 are on the axial end surface of the annular covering part 22. That is, the first holding groove 35 and the second holding groove 36 are formed at one side and the other side sandwiching the support column part 26 in the circumferential direction. The support column part 26 is provided at a position, to which the tooth covering part 23 is extended in the radial direction. The first holding groove 35 holds the winding start part of the coil wire of the winding 30 and the second holding groove 36 holds the winding end part of the coil wire of the winding 30.

The first holding groove 35 and the second holding groove 36 are formed to be separated more from each other in the circumferential direction sandwiching the tooth covering part 23 as they extend in the radially outward direction.

Figure 11:
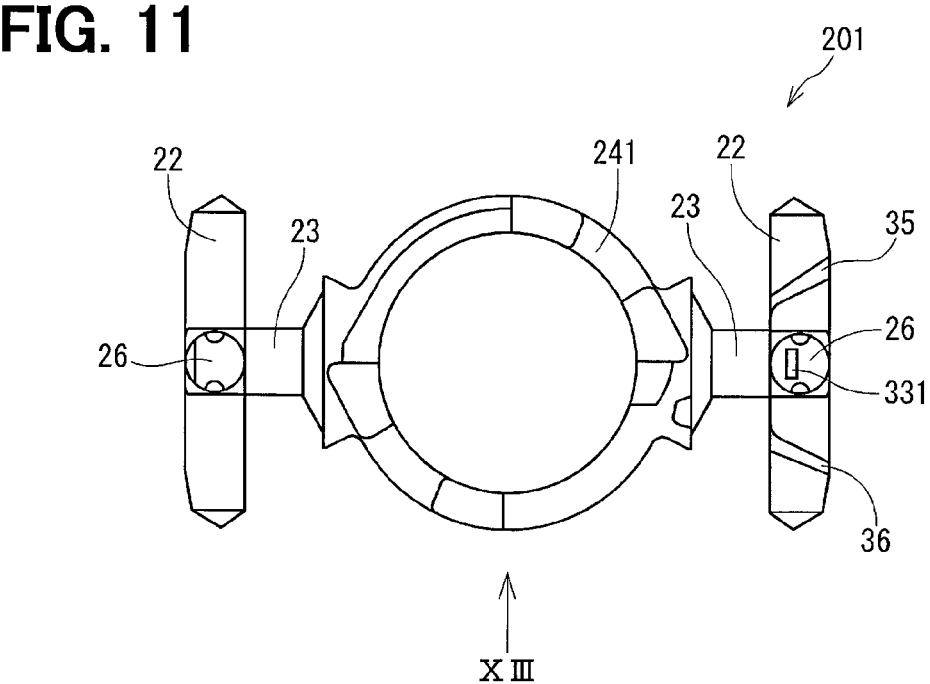
FIG. 11 is top plan view of a core segment sub-assembly forming the stator according to the embodiment.
Figure 12:
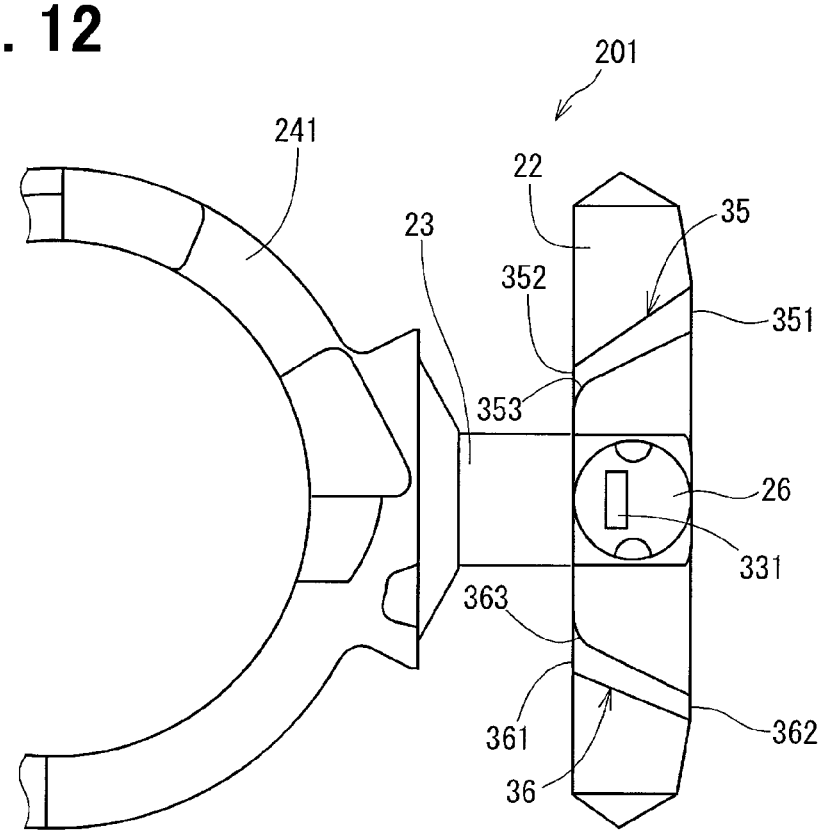
FIG. 12 is an enlarged view of a part of FIG. 11.
Figure 13:
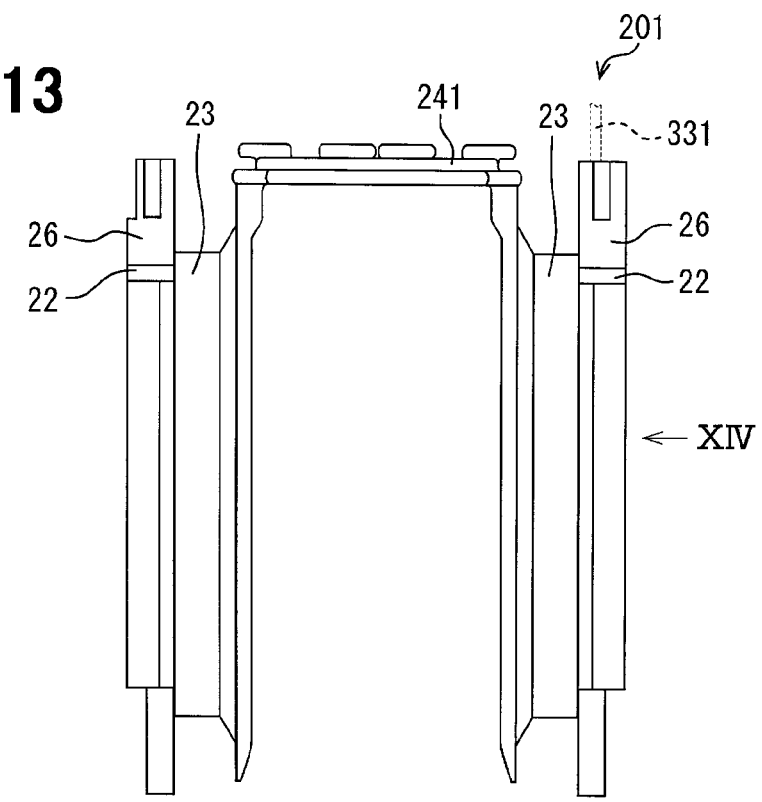
FIG. 13 is a side view taken in a direction XIII in FIG. 11.
Figure 14:
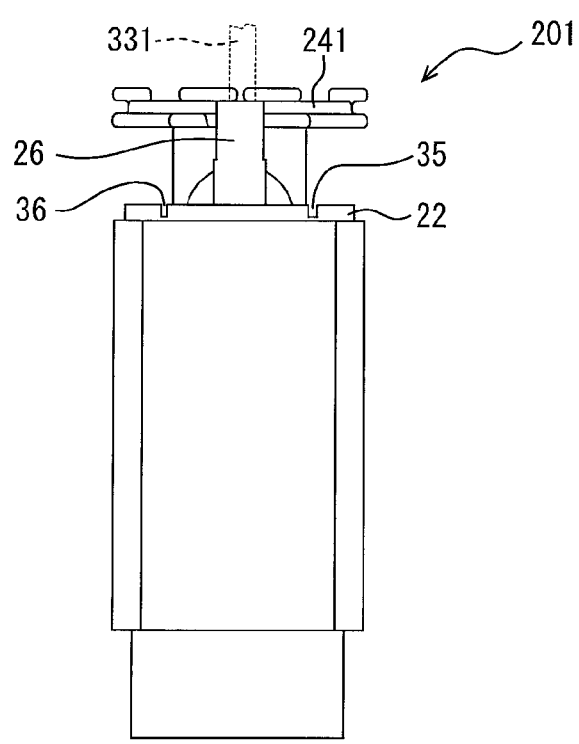
FIG. 14 is a side view taken in a direction XIV in FIG. 13.

That is, in FIG. 11 and FIG. 12, the first holding groove 35 and the second holding groove 36 are distanced such that the first holding groove 35 and the second holding groove 36 are inclined in the right upward direction and in the right downward direction in FIG. 12 relative to the tooth covering part 23, respectively.

As shown in FIG. 12, further, the first holding groove 35 is formed to have a groove width, which is wider at a winding entrance 351 than at a winding exit 352. A round corner part 353 is formed at a corner part at the radially inside of the annular covering part 22, that is, at the exit 352 side, and at a corner part closer to the tooth covering part 23 in the circumferential direction, that is, adjacent to the tooth covering part 23. The round corner part 353 is thus widened toward the radially inward direction. The second holding groove 36 is formed to have a groove width, which is wider at a winding entrance 361 than at a winding exit 362. A round corner part 363 is formed at a corner part at the radially inside of the annular covering part 22, that is, at the entrance 361 side, and at a corner part closer to the tooth covering part 23 in the circumferential direction, that is, adjacent to the tooth covering part 23. The round corner part 363 is thus widened toward the radially inward direction.

The first holding groove 35 and the second holding groove 36 configured as described above has the following functions and advantages. At a winding start stage in a winding process by a flyer type winding method, a conductive coil wire, an end of which is held by a holding unit, inclines from an outside to an inside from a radially outside part toward a radially inside part. At a winding end stage, the coil wire inclines from the inside to the outside from the radially inside part toward the radially outside part. Since the first holding groove 35 and the second holding groove 36 are formed to match the path of extension of the coil wire, the grooves 35 and 36 are suited to the winding process by the flyer type winding method. In case that the manufacturing process is automated, in particular, the operation of a winding machine can be minimized and productivity can be improved.

By forming the entrances 351 and 361 to be wider in groove width than a wire diameter of the winding 30, the coil wire can be easily inserted in position in the holding grooves. Thus, errors of a work position and a wire holding position at the time of winding operation can be made tolerable. The positioning need not be regulated so accurately and work efficiency can be improved.

By narrowing the groove widths near the exits 352 and 362 to be equal to or only slightly larger than the wire diameter of the winding 30, the winding 30 can be prevented from being pulled out or displaced after having been once inserted therein. Thus, coil wire ends of the winding 30 can be held surely and high quality can be secured particularly in the automated manufacturing process.

By forming the round corner part 353 at the tooth 23 side in the exit 352 of the first holding groove 35, the winding 30 extending toward the tooth covering part 23 is protected from touching the sharp edge of the exit 352 and being damaged. By forming the round corner part 363 at the tooth 23 side in the entrance 361 of the second holding groove 36, the winding 30 returning from the central annular part 241 is protected from touching the sharp edge of the entrance 361 and being damaged.

A winding process by a winding machine of a flyer type will be described next with reference to FIG. 15 to FIG. 22. In the following description about the winding process, the core segment sub-assembly 201 is referred to as a work 201 exemplarily. A coil wire, which is before wound, is referred to as a coil wire, which is designated by the same reference numeral 30 as the winding 30. The winding process includes eight steps (first step to eighth step), in which the second step and the eighth step are for wire-laying in the holding grooves 35 and 36. FIG. 15 to FIG. 18 are schematic plan views viewed from the top side. The work 201 is set on a rotary base (not shown) by a jig (not shown). Since the rotary base rotates, the work 201 is rotatable in the horizontal plane.

A winding machine 85 has a flyer arm 87, which protrudes from a spindle 86 provided in the horizontal direction. The spindle 86 is rotatable and also reciprocally movable in its axial direction. The coil wire 30 is accommodated in an accommodation part (not shown) and is fed out from a feeder part 88 provided at the top end of the flyer arm 87. A coil end holder unit 89 holds an end part 301 of the coil wire 30.

(First Step)

Figure 15:
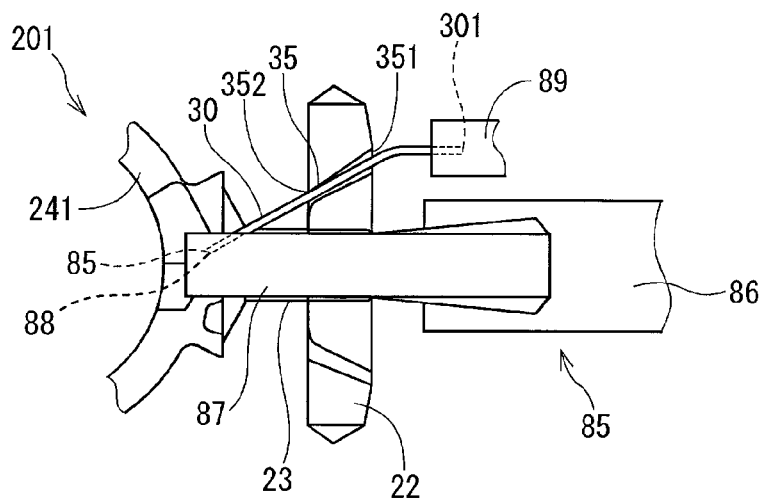
FIG. 15 is a schematic view showing a first step of a stator manufacturing method according to the embodiment.

In an initial state, as shown in FIG. 15, the work 201 is set so that the annular covering part 22 at the terminal 331 side is in a direction of the spindle 86 of the winding machine 85. That is, the annular covering part 22, on which the terminal 331 is provided, is located close to the spindle 86. The spindle 86 is advanced and the flyer arm 87 is directed upward. Under this state, the coil wire 30 connecting the end holder unit 89 and the feeder part 88 of the flyer arm 97 is set right above the first holding groove 35 of the work 201.

(Second Step)

Figure 16:
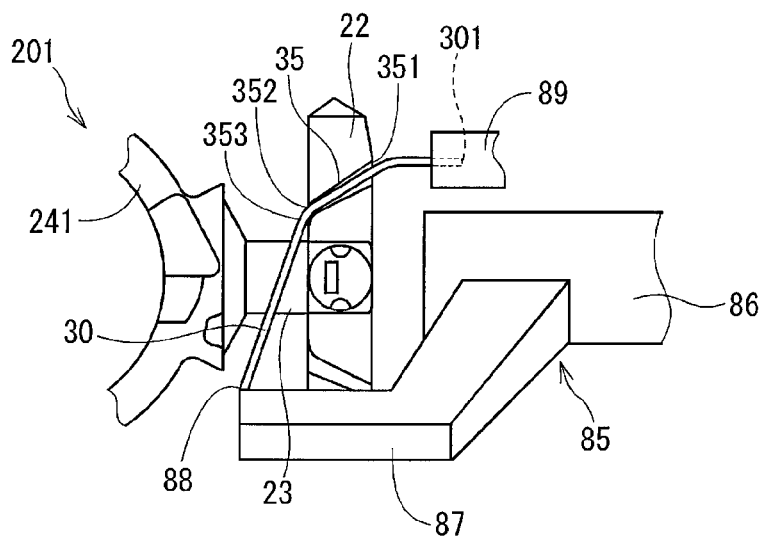
FIG. 16 is a schematic view showing a second step of the stator manufacturing method.

At a second step, which is the wire laying step, shown in FIG. 16, the flyer arm 87 is slightly turned or inclined to insert and accommodate the coil wire 30 between the entrance 351 and the exit 352 of the first holding groove 35.

(Third Step)

Figure 17:
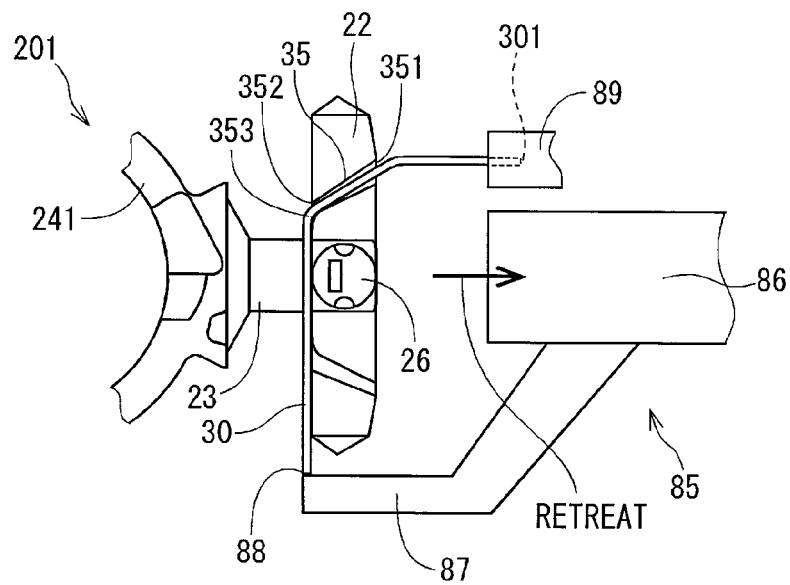
FIG. 17 is a schematic view showing a third step of the stator manufacturing method.

At a third step shown in FIG. 17, the flyer arm 87 is further turned close to the horizontal plane. The coil wire 30 is lowered to a height near the top surface of the tooth covering part 23 and retreated so that the coil wire 30 extends along the radially inner wall of the annular covering part 22. At this time, the round corner part 353 of the first holding groove 35 protects the coil wire 30 from being damaged. The support part 26 is formed in the column shape having no edge corners, and hence the support part 26 does not damage the coil wire 30 either by edge corners.

(Fourth Step)

Figure 18:
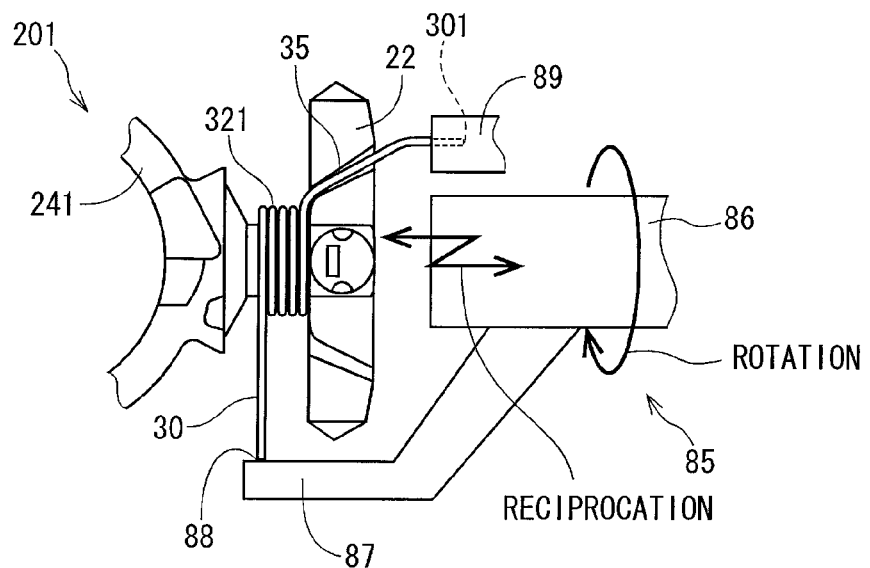
FIG. 18 is a schematic view showing a fourth step of the stator manufacturing method.

At a fourth step, which is a winding step, shown in FIG. 18, the spindle 86 rotates while reciprocating to advance and retreat so that the coil wire 30 is wound about the tooth covering part 23 at the terminal 331 side. In this step, the coil wire 30 is wound in multiple layers by repeating winding one layer when the spindle 86 is advanced and winding another layer when the spindle 86 is retreated. By this step, the W-phase first coil 321 (W1) is wound.

(Fifth Step)

Figure 19:
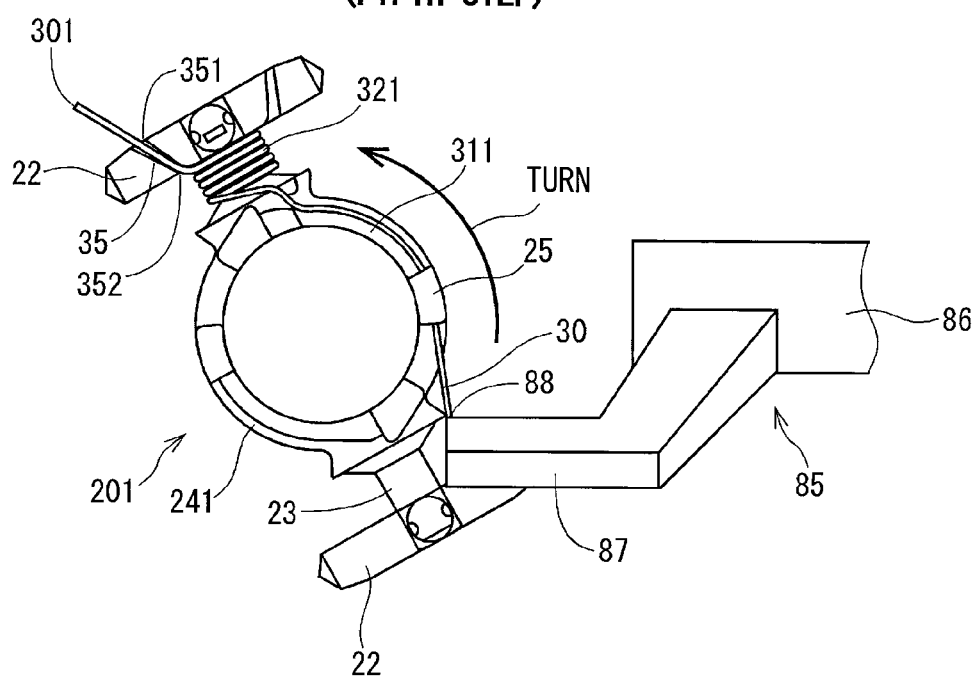
FIG. 19 is a schematic view showing a fifth step of the stator manufacturing method.

At a fifth step, which is a work reversing step, shown in FIG. 19, the rotary base (not shown) is turned so that the work 201 is reversed in position. For example, the work 201 is turned in the counter-clock direction. At this time, the end part 301, which has been held by the end holding unit 89 through the first step to the fourth step, is released. However, since the width of the first holding groove 35 is formed relatively narrow near the exit 352, the coil wire 30 held by the first holding groove 35 is prevented from pulled out or displaced. While the work 201 is being turned, the coil wire 30 is laid as the bridging wire 311 along the outer wall of the central annular part 241 and held by a bridging wire holding part 25.

(Sixth Step)

Figure 20:
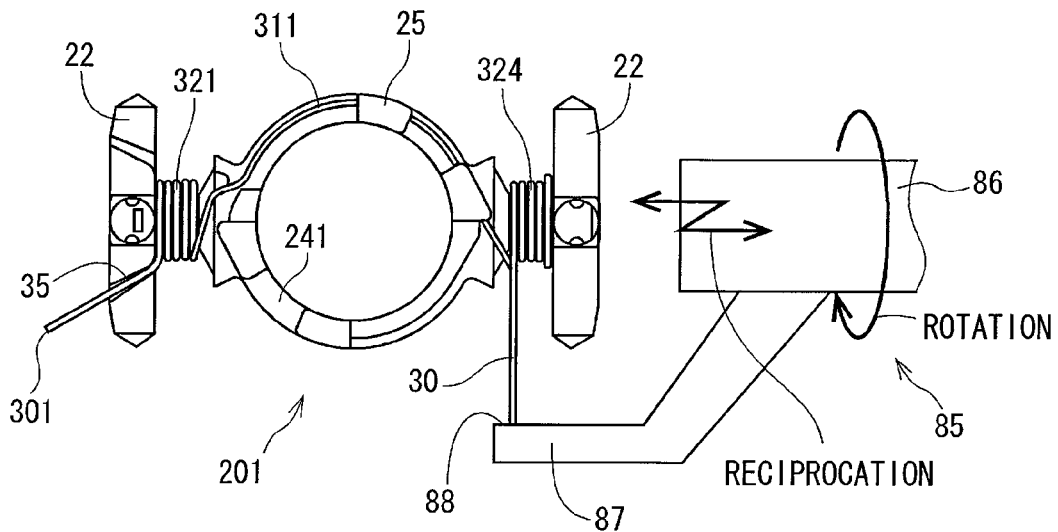
FIG. 20 is a schematic view showing a sixth step of the stator manufacturing method.

At a sixth step shown in FIG. 20, which is a winding step performed after the rotation of 180 degrees, that is, after the position of the work 201 is reversed on the horizontal plane, the coil wire 30 is wound about the tooth covering part 23, which is opposite to the wire end 301 side, in the similar manner as at the fourth step shown in FIG. 18. By this step, the W-phase second coil 324 (W2) shown in FIG. 8 is wound.

(Seventh Step)

Figure 21:
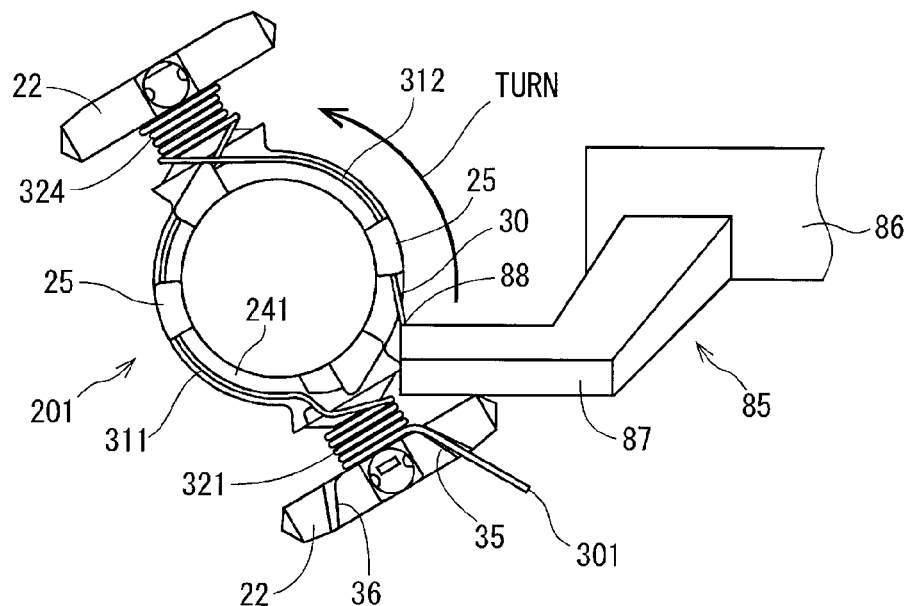
FIG. 21 is a schematic view showing a seventh step of the stator manufacturing method.

At a seventh step, which is a work reversing step, shown in FIG. 21, the work 201 is turned in the same direction as in the fifth step so that the work 201 is reversed again in the end. When the work 201 is thus reversed, the coil wire 30 is laid as the bridging wire 312 along an outer wall, which is opposite to the outer wall in the fifth step. The coil wire 30 is thus held in a bridging wire holding part 25.

(Eighth Step)

Figure 22:
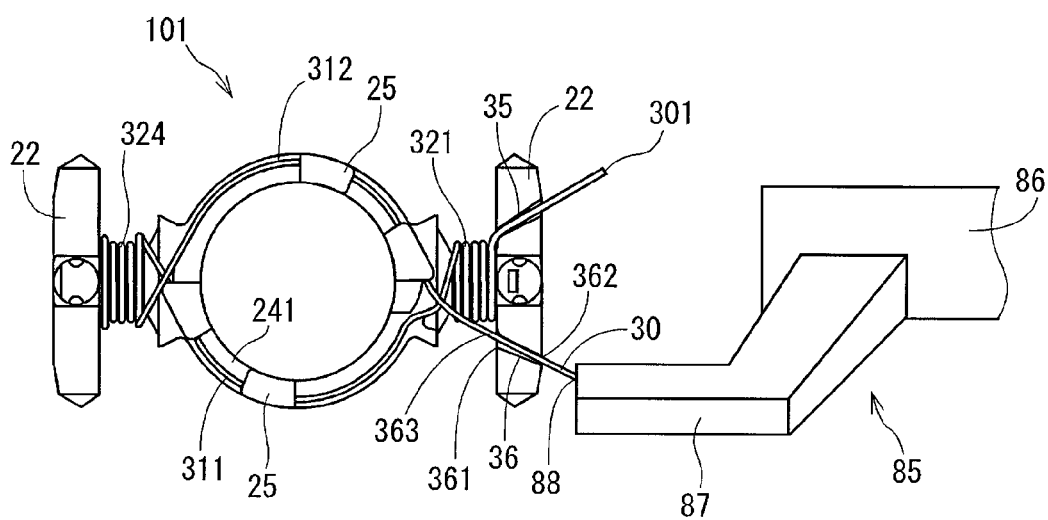
FIG. 22 is a schematic view showing an eighth step of the stator manufacturing method.

At an eighth step, which is a groove bridging step, shown in FIG. 22, the flyer arm 87 is tilted slightly. An extended part of the bridging wire 312 of the wire coil 30 is accommodated between the entrance 361 and the exit 362 of the second holding groove 36 in the similar manner as at the second step. The round corner part 363 of the second holding groove 36 protects the coil wire 30 from being damaged. The narrowed groove width at the exit 362 prevents the coil wire 30 from being pulled out or displaced. By the series of the above-described steps, the stator segment 101 is completed as shown in FIG. 8A.

Other Embodiments (A) According to the embodiment described above, the core 11 is formed of divided cores 111 to 116 and the stator 10 is formed by assembling the stator segments 101 to 103. The stator segments 101 to 103 are formed of core segment sub-assemblies 201 to 203 and the winding 30 wound thereabout, respectively. In each core segment sub-assembly 201 to 203, a pair of core pieces opposing each other sandwiching the central axis is molded with resin as one unit. In the winding step of the core segment sub-assembly 201, the work is reversed and the coils 321 and 324 are wound at two locations within one of the manufacturing steps. For this reason, the first holding groove 35 and the second holding groove 36 are formed in only one of the two annular covering parts 22 of each core segment sub-assembly 201 to 201.

However, the first holding groove 35 and the second holding groove 36 may also be applied to a stator formed integrally, a stator formed by bending an expanded body or the like, without being limited to stators of a type of divided cores or a type of combined elements. It is thus probable that the coil is wound location by location in one of the manufacturing steps. It is preferable in this case that the first holding groove 35 and the second holding groove 36 are formed in all of the annular covering part 22. The step of reversing the work may be obviated.

(B) According to the above-described embodiment, the motor part 3 of the fuel pump 1 has the three-phase winding 30, which is connected in the delta shape. The three-phase winding 30 may be connected in the star shape. The brushless motor is not limited to the three-phase type but may be a two-phase type. The terminals and coils of the U-phase, the V-phase and the W-phase of the three-phase power may be laid out differently from the above-described embodiment.

(C) The motor part 3 other than the stator 10 and the fuel pump other than the motor part 3 may be configured differently from the above-described embodiment.

(D) The stator according to the embodiment is not limited to the brushless motor but may be used in other devices such as a pump for other fluids or any other devices, which use rotary driving force.

What is claimed is:

1. A stator of a motor, which rotates a rotor by a rotating magnetic field generated when electric power is supplied, the stator comprising:
a winding of multiple phases;
a core including an annular part and a plurality of tooth parts, the annular part extending in a circumferential direction to form an annular outer periphery, and the plurality of tooth parts protruding inwardly in a radial direction from the annular part;
a terminal for electric power supply to the winding; and
an insulator including an annular covering part, which covers and insulates the annular part, and a tooth covering part, which covers and insulates the tooth part and on which the winding is wound, wherein:
the insulator holds the terminal;
the insulator further includes a first holding groove, which holds a start part of a coil wire of one phase of the winding for connection to the terminal, and a second holding groove, which holds an end part of the coil wire of the one phase of the winding, at positions on an axial end surface of the annular covering part and shifted in a circumferential direction relative to the tooth covering part, the first holding groove and the second holding groove being formed sandwiching the tooth covering part and the terminal therebetween and distanced more from each other as extending in a radially outward direction;
the first holding groove and the second holding groove are inclined relative to the tooth covering part in opposite directions over lengths between respective entrances and exits;
the first holding groove has an exit with only one rounded corner; and
the second holding groove has an entrance with only one rounded corner.

2. The stator according to claim 1, wherein:
the first holding groove and the second holding groove are formed wider in groove width at the respective entrances than at the respective exits.

3. The stator according to claim 1, wherein:
the first holding groove and the second holding groove have respective round corner parts, which are formed at radially inside of the annular covering part and widened in an open direction at a corner part on a tooth covering part side in a circumferential direction.

4. A stator manufacturing method for winding, by a flyer type winding machine, the coil wire about the tooth covering part of the stator according to claim 1, the stator manufacturing method comprising steps of:
accommodating a start part of the coil wire of the winding in the first holding groove;
winding the coil wire about the tooth covering part; and
accommodating an end part of the coil wire of the winding in the second holding groove.

5. A stator of a motor, which rotates a rotor by a rotating magnetic field generated when electric power is supplied, the stator comprising:
a winding of multiple phases;
a core including an annular part and a plurality of tooth parts, the annular part extending in a circumferential direction to form an annular outer periphery, and the plurality of tooth parts protruding inwardly in a radial direction from the annular part;
a terminal for electric power supply to the winding; and an insulator including an annular covering part, which covers and insulates the annular part, and a tooth covering part, which covers and insulates the tooth part and on which the winding is wound, wherein:

the insulator holds the terminal;

the insulator further includes a first holding groove, which holds a start part of a coil wire of one phase of the winding for connection to the terminal, and a second holding groove, which holds an end part of the coil wire of the one phase of the winding, at positions on an axial end surface of the annular covering part and shifted in a circumferential direction relative to the tooth covering part, the first holding groove and the second holding groove being formed sandwiching the tooth covering part and the terminal therebetween and distanced more from each other as extending in a radially outward direction;

the first holding groove and the second holding groove are inclined relative to the tooth covering part in opposite directions over lengths between respective entrances and exits;

the winding includes multiple phase winding parts;

the coil wire of each phase winding part is wound on a pair of the plurality of tooth parts;

the first holding groove and the second holding groove are formed on the tooth covering part of only one of the pair of the plurality of tooth parts; and the first holding groove has an exit with only one rounded corner; and the second holding groove has an entrance with only one rounded corner.

6. A stator of a motor, which rotates a rotor by a rotating magnetic field generated when electric power is supplied, the stator comprising:

a winding of multiple phases;

a core including an annular part and a plurality of tooth parts, the annular part extending in a circumferential direction to form an annular outer periphery, and the plurality of tooth parts protruding inwardly in a radial direction from the annular part;

a terminal for electric power supply to the winding; and an insulator including an annular covering part, which covers and insulates the annular part, and a tooth covering part, which covers and insulates the tooth part and on which the winding is wound, wherein:

the insulator holds the terminal;

the insulator further includes a first holding groove, which holds a start part of a coil wire of one phase of the winding for connection to the terminal, and a second holding groove, which holds an end part of the coil wire of the one phase of the winding, at positions on an axial end surface of the annular covering part and shifted in a circumferential direction relative to the tooth covering part, the first holding groove and the second holding groove being formed sandwiching the tooth covering part and the terminal therebetween and distanced more from each other as extending in a radially outward direction;

the first holding groove and the second holding groove are formed wider in groove width at respective entrances than at respective exits; and the respective entrances of the first hold groove and the second holding groove are on opposing radial sides of the annular covering part.

* * * * *